United States Patent
Amir et al.

(10) Patent No.: US 12,167,090 B2
(45) Date of Patent: Dec. 10, 2024

(54) SYSTEM, METHOD AND COMPUTER-READABLE MEDIUM FOR RECOMMENDING STREAMING DATA

(71) Applicant: 17LIVE Japan Inc., Tokyo (JP)

(72) Inventors: Mohammad Amir, Tokyo (JP); Uday Kumar Edudula, Tokyo (JP); Anmol Mohan, Tokyo (JP); Jayneel Pawar, Tokyo (JP); Gaurav Tyagi, Tokyo (JP)

(73) Assignee: 17LIVE Japan Inc., Tokyo (JP)

( * ) Notice: Subject to any disclaimer, the term of this patent is extended or adjusted under 35 U.S.C. 154(b) by 0 days.

(21) Appl. No.: 17/902,151

(22) Filed: Sep. 2, 2022

(65) Prior Publication Data

US 2023/0269432 A1 Aug. 24, 2023

(30) Foreign Application Priority Data

Feb. 22, 2022 (JP) ................. 2022-026204

(51) Int. Cl.
*H04N 21/466* (2011.01)
*H04N 21/2187* (2011.01)
*H04N 21/258* (2011.01)
*H04N 21/266* (2011.01)

(52) U.S. Cl.
CPC ..... *H04N 21/4668* (2013.01); *H04N 21/2187* (2013.01); *H04N 21/25891* (2013.01); *H04N 21/266* (2013.01)

(58) Field of Classification Search
CPC .......... H04N 21/4668; H04N 21/2187; H04N 21/25891; H04N 21/266
See application file for complete search history.

(56) References Cited

U.S. PATENT DOCUMENTS

| 11,483,630 | B1 * | 10/2022 | Panchaksharaiah | .. G06F 16/735 |
| 2008/0086750 | A1 * | 4/2008 | Yasrebi | ................... H04L 67/52 |
| | | | | 348/E7.071 |
| 2016/0105698 | A1 * | 4/2016 | Tang | ................. H04N 21/4627 |
| | | | | 725/25 |
| 2018/0367861 | A1 * | 12/2018 | Sanghavi | ......... H04N 21/26258 |

FOREIGN PATENT DOCUMENTS

JP 2019-164617 A 9/2019

OTHER PUBLICATIONS

Notice of Reasons for Refusal dated Aug. 30, 2022, issued in corresponding Japanese Patent Application No. 2022-026204 with English translation (6 pgs.).

* cited by examiner

*Primary Examiner* — Nnenna N Ekpo
(74) *Attorney, Agent, or Firm* — Pillsbury Winthrop Shaw Pittman, LLP

(57) ABSTRACT

The present disclosure relates to a system, a method and a computer-readable tangible non-transitory medium for recommending live streaming data. The method includes identifying a set of live streaming programs according to an attribute of the user and a tag of each live streaming program in the set of live streaming programs, generating a first subset of live streaming programs from the set of live streaming programs according to a first criterion, and generating a second subset of live streaming programs from the set of live streaming programs according to a second criterion. The first criterion is different from the second criterion. The present disclosure can recommend contents in a more efficient way and increase user engagements.

11 Claims, 12 Drawing Sheets

Available LS table

| Live streaming program | Tags | | | Streaming tag vector | Popularity Score |
|---|---|---|---|---|---|
| | TG1 | TG2 | TG3 | | |
| LS1 | 1 | 0 | 0 | [1, 0, 0] | 1 |
| LS2 | 1 | 1 | 0 | [1, 1, 0] | 0.7 |
| LS3 | 1 | 0.5 | 1 | [1, 0.5, 1] | 0.1 |
| ... | | | | ... | |
| LS100 | | | | | |

FIG. 4

User table

| Users | Tags/Atributes | | | User tag vector |
|---|---|---|---|---|
| | TG1 | TG2 | TG3 | |
| U1 | 1 | 1 | 1 | [1, 1, 1] |
| U2 | 1 | 1 | 0 | [1, 1, 0] |

FIG. 5

Similarity score (dot product of user tag vector and live streaming tag vector)

| User tag vector | | Streaming tag vector | Similarity score |
|---|---|---|---|
| U1 | [1, 1, 1] | LS1 [1, 0, 0] | 1 |
| | | LS2 [1, 1, 0] | 2 |
| | | LS3 [1, 0.5, 1] | 2.5 |
| U2 | [1, 1, 0] | LS1 [1, 0, 0] | 1 |
| | | LS2 [1, 1, 0] | 2 |
| | | LS3 [1, 0.5, 1] | 1.5 |

FIG. 6

Final Score (equally weighted sum of similarity score and popularity score)

| User | Live streaming program | Similarity score | Popularity score for each live streaming program | Final score |
|---|---|---|---|---|
| U1 | LS1 | 1 | 1 | 2 |
| | LS2 | 2 | 0.7 | 2.7 |
| | LS3 | 2.5 | 0.1 | 2.6 |
| U2 | LS1 | 1 | 1 | 2 |
| | LS2 | 2 | 0.7 | 2.7 |
| | LS3 | 1.5 | 0.1 | 1.6 |

FIG. 7

Recommendation table

| Candidate set | First 5 mins | Next 5 mins | Next 5 mins |
|---|---|---|---|
| | Criterion C1 | Criterion C2 | Criterion C3 |
| | Subset SB1 | Subset SB2 | Subset SB3 |
| LSS1 | LSS1 | LSS3 | LSS2 |
| LSS2 | LSS4 | LSS6 | LSS5 |
| LSS3 | LSS7 | LSS8 | LSS9 |
| LSS4 | | | LSS10 |
| ... | | | |
| LSS10 | | | |

FIG. 8

SYSTEM, METHOD AND COMPUTER-READABLE MEDIUM FOR RECOMMENDING STREAMING DATA

CROSS-REFERENCE TO RELATED APPLICATIONS

This application is based on and claims the benefit of priority from Japanese Patent Application Serial No. 2022-026204 (filed on Feb. 22, 2022), the contents of which are hereby incorporated by reference in its entirety.

TECHNICAL FIELD

The present disclosure relates to recommending streaming data and, more particularly, to recommending live streaming data.

BACKGROUND

Real time data on the Internet, such as live streaming programs, has become popular in our daily life. There are various platforms or providers providing the service of real time data accessing, and the competition is fierce. Therefore, it is important for a content provider to efficiently, precisely, and vibrantly recommend its users or viewers their desirable contents such that the viewers can stay on the platform as long as possible. Japanese patent application publication JP2019-164617A discloses a system for recommending live videos to users.

SUMMARY

A method according to one embodiment of the present disclosure is a method for providing information of live streaming programs to a user being executed by one or a plurality of computers, and includes: identifying a set of live streaming programs according to an attribute of the user and a tag of each live streaming program in the set of live streaming programs, generating a first subset of live streaming programs from the set of live streaming programs according to a first criterion, and generating a second subset of live streaming programs from the set of live streaming programs according to a second criterion. The first criterion is different from the second criterion.

A system according to one embodiment of the present disclosure is a system for providing information of live streaming programs to a user that includes one or a plurality of processors, and the one or plurality of computer processors execute a machine-readable instruction to perform: identifying a set of live streaming programs according to an attribute of the user and a tag of each live streaming program in the set of live streaming programs, generating a first subset of live streaming programs from the set of live streaming programs according to a first criterion, and generating a second subset of live streaming programs from the set of live streaming programs according to a second criterion. The first criterion is different from the second criterion.

A computer-readable medium according to one embodiment of the present disclosure is a non-transitory computer-readable medium including a program for providing information of live streaming programs to a user, and the program causes one or a plurality of computers to execute: identifying a set of live streaming programs according to an attribute of the user and a tag of each live streaming program in the set of live streaming programs, generating a first subset of live streaming programs from the set of live streaming programs according to a first criterion, and generating a second subset of live streaming programs from the set of live streaming programs according to a second criterion. The first criterion is different from the second criterion.

A method according to one embodiment of the present disclosure is a method for providing information of live streaming programs to a user being executed by one or a plurality of computers, and includes: identifying a set of live streaming programs according to attributes of the user and tags of each live streaming program in the set of live streaming programs, periodically reordering live streaming programs in the set of live streaming programs according to a time-varying criterion rule, and periodically providing information of the live streaming programs in the set of live streaming programs to the user according to results of the reordering.

BRIEF DESCRIPTION OF THE DRAWINGS

FIG. 4 shows an exemplary available LS table 316 of available live streaming programs in accordance with some embodiments of the present disclosure.

FIG. 5 shows an exemplary user table 318 of users in accordance with some embodiments of the present disclosure.

FIG. 6 shows an example of similarity score calculation in accordance with some embodiments of the present disclosure.

FIG. 7 shows an example of final score calculation in accordance with some embodiments of the present disclosure.

FIG. 8 shows an exemplary recommendation table 320 for storing the results of generating subsets of live streaming programs in accordance with some embodiments of the present disclosure.

DESCRIPTION OF THE EMBODIMENTS

Conventional recommendation methods or systems for live data on the internet face several challenges that need to be addressed.

One challenge is how to recommend contents to a viewer in a customized manner, in other words, how to accommodate the differences in different users' preferences. Conventional recommendation algorithms do not take these preferences into consideration, which results that all viewers see more or less the same contents.

Another challenge is how to provide an equal exposure chance (or an equal chance of being recommended) for all content distributors, such that a bias situation can be prevented. A bias situation is where popular distributors get more popular due to higher chance of being recommended, and new distributors or less popular distributors get less attention due to lower chance of being recommended. With conventional algorithms, some contents or programs may never get the attention they deserve.

Another challenge is how to prevent the viewers from getting bored during the recommendation process. Conventional recommendation systems generate the recommended contents, display the contents to the users, and wait for their next move such as clicking to access or join a certain content. If the user does not take any action, the displayed contents just stay unchanged and the user may get bored easily and leave the platform. Sometimes the user sees the same recommended contents before and after accessing a live streaming program, which may prompt the user to leave the live streaming service.

Figure 9:
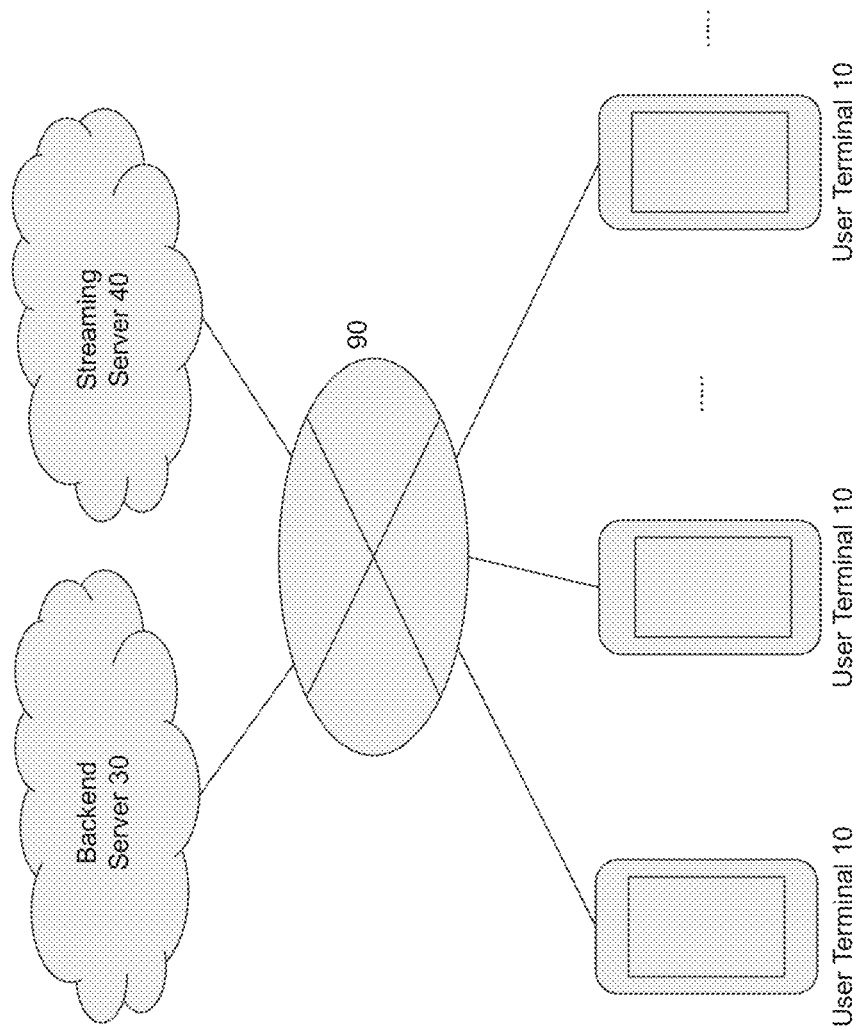
FIG. 9 shows a schematic configuration of a communication system according to some embodiments of the present disclosure.
Figure 10:
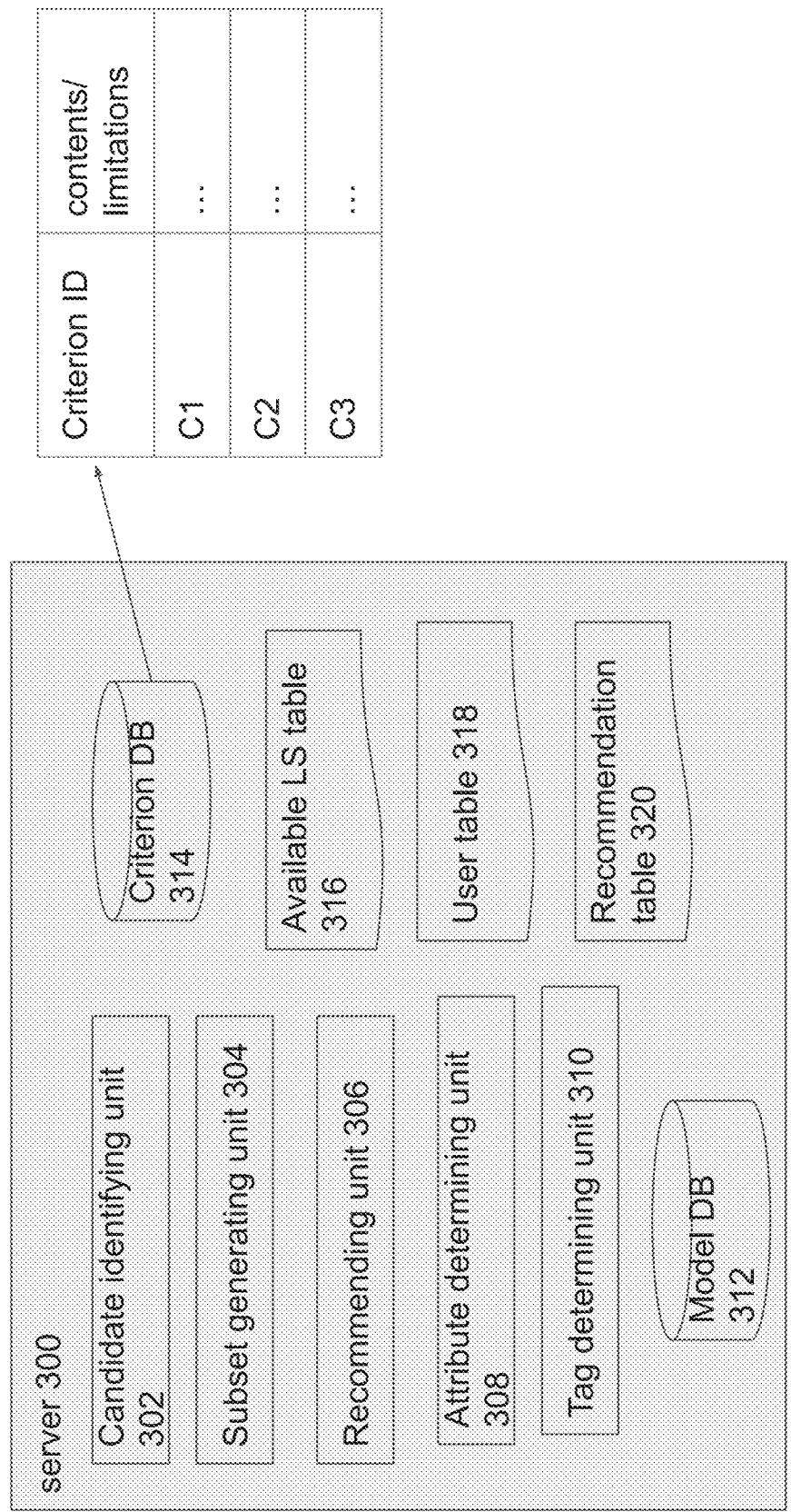
FIG. 10 shows an exemplary block diagram of a server in accordance with some embodiments of the present disclosure.

FIG. 10 shows an exemplary block diagram of a server in accordance with some embodiments of the present disclosure. The server 300 comprises a candidate identifying unit 302, a subset generating unit 304, a recommending unit 306, an attribute determining unit 308, a tag determining unit 310, a criterion DB (data base) 314, an available LS (live streaming) table 316, a user table 318, a recommendation table 320, and a model DB 312. In some embodiments, the server 300 may be a portion of or may be the backend server 30 or the streaming server 40 in FIG. 9.

In some embodiments, the candidate identifying unit 302 is configured to identify a candidate set of live streaming programs from all available live streaming programs.

In some embodiments, the subset generating unit 304 is configured to generate subsets of live streaming programs from the candidate set of live streaming programs.

In some embodiments, the recommending unit 306 is configured to recommend live streaming programs (or provide information about live streaming programs) to a user. For example, the recommending unit 306 may initiate or trigger a process of displaying information about recommended live streaming programs on a user terminal used by a user to access a live streaming program.

In some embodiments, the attribute determining unit 308 is configured to determine attributes of a user or a viewer of live streaming programs. An initial input of the user or a behavior history of the user on a live streaming platform may be utilized in determining attributes of the user.

In some embodiments, the tag determining unit 310 is configured to determine tags of a live streaming program. An AI or machine learning model may be utilized in determining tags of a live streaming program.

In some embodiments, the model DB 312 is configured to store various machine learning models, some of which may be used in determining tags of a live streaming program or in determining attributes of a user.

In some embodiments, the criterion DB 314 is configured to store criteria for generating subsets of live streaming programs. In some embodiments, criteria for generating subsets of live streaming programs may be registered in the criterion DB 314. For example, each criterion may correspond to a criterion ID in the criterion DB 314.

In some embodiments, the available LS table 316 records or lists all available live streaming programs at a certain time, along with their information such as their respective tags. An example of the available LS table 316 is shown in FIG. 4.

In some embodiments, the user table 318 records or lists information of users, such as their attributes. An example of the user table 318 is shown in FIG. 5.

In some embodiments, the recommendation table 320 records or stores results of generating subsets of live streaming programs. An example of the recommendation table 320 is shown in FIG. 8.

Figure 1:
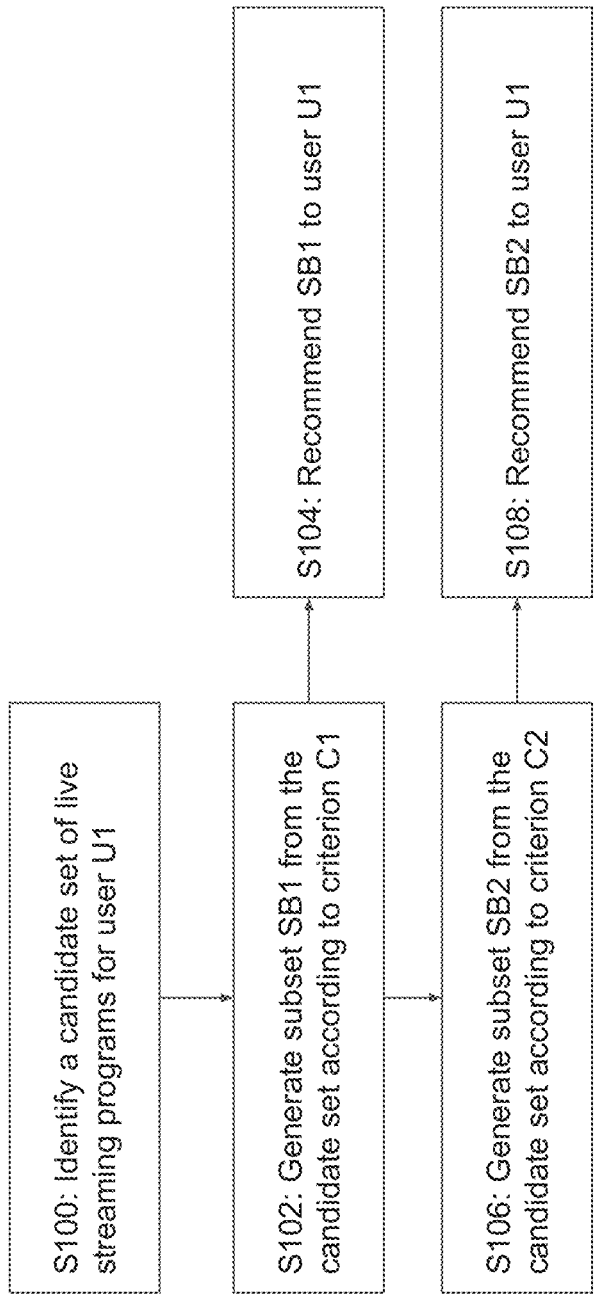
FIG. 1 shows an exemplary flow chart illustrating a method of recommendation in accordance with some embodiments of the present disclosure.

FIG. 1 shows an exemplary flow chart illustrating a method of recommendation in accordance with some embodiments of the present disclosure. FIG. 1 shows how contents are recommended to a user U1 in some embodiments.

In step S100, the candidate identifying unit 302, identifies, determines, filter-outs, or generates a candidate set of live streaming programs for a user (or viewer) U1. The candidate set of live streaming programs may be identified from all available live streaming programs according to attributes of user U1 and tags of each available live streaming program, which will be explained in detail later in the following paragraphs.

In step S102, the subset generating unit 304 generates, sorts, or determines a subset SB1 of live streaming programs from the candidate set of live streaming programs, according to a criterion C1 stored in the criterion DB 314. The criterion C1 may include any form of limitation, type or range. For example, in some embodiments, the criterion C1 may include limitation or range on levels of distributors of the live streaming programs. Such level is defined in a live streaming platform to represent the degree of engagement of the distributor. In some embodiments, the criterion C1 may include identities of distributors of the live streaming programs (for example, contracted distributors, professional distributors or other identities). In some embodiments, the criterion C1 may be a random pick, i.e. to randomly choose a predetermined number of live streaming programs from the candidate set. A plurality of different criteria may be defined by an operator of the platform and are registered in the criterion DB 314.

In step S104, the recommending unit 306 recommends the subset SB1 to user U1. In some embodiments, the recommending unit 306 may provide information of the subset SB1 to user U1. For example, the recommending may include providing or displaying one or more image, text, alert or any form of notification corresponding to one or more live streaming programs in the subset SB1 on a device user U1 used to access live streaming data. In some embodiments, the recommending may include displaying images corresponding to live streaming programs in the subset SB1 in order on a device user U1 used to access live streaming data.

In step S106, a subset SB2 of live streaming programs is generated, sorted or determined, from the candidate set of live streaming programs, according to a criterion C2. The criterion C2 may include any form of limitation, type or range. For example, in some embodiments, the criterion C2 may include limitation or range on levels of distributors of the live streaming programs. In some embodiments, the criterion C2 may include identities of distributors of the live streaming programs (for example, contracted distributors, professional distributors or other identities).

The criterion C2 is different from the criterion C1. In some embodiments, the criterion C1 and the criterion C2 are determined such that there is no overlap between the subset SB1 and the subset SB2. In other words, there may be no live streaming program existing in both the subset SB1 and the subset SB2. For example, criterion C1 may include the limitation [contract status: yes, level>50] while criterion C2 may include the limitation [contract status: no, 30≤level≤50]. In some embodiments, different criterions can be as simple as different order limitations on the candidate set of live streaming programs. In that case, different subsets of live streaming programs include live streaming programs in different places (or in different orders, or in different arrangements) within the candidate set of live streaming programs.

In step S108, the subset SB2 is recommended to user U1. In some embodiments, the recommending may include providing information of the subset SB2 to user U1. For example, the recommending may include providing or displaying one or more image, text, alert or any form of notification corresponding to one or more live streaming programs in the subset SB2 on a device user U1 uses to access live streaming data. In some embodiments, the recommending may include displaying images corresponding to live streaming programs in the subset SB2 in order on a device user U1 uses to access live streaming data.

In some embodiments, the subset SB2 is recommended to user U1 in a predetermined time interval after the subset SB1 is recommended to user U1. In some embodiments, the subset SB2 is recommended to user U1 after a predetermined time interval from recommending the subset SB1 to user U1. The predetermined time interval could be, for example, 2 mins or 5 mins.

In some embodiments, a new or different subset of live streaming programs may be generated from the candidate set of live streaming programs according to a new or different criterion periodically, or in every predetermined time interval, or in a time-varying manner. Information of the new subset of live streaming programs may be provided to user U1 in an automatic manner without any input from user U1 indicating a request for a new subset of live streaming programs. For example, user U1 does not need to input any action (such as clicking or scrolling) and the recommended live streaming programs keep changing automatically. In some embodiments, a new criterion is different from all former criteria such that a new subset of live streaming programs has no overlap with all former subsets of live streaming programs. In some embodiments, different criterions may be used to form a time-varying criterion rule. In some embodiments, live streaming programs in the candidate set are reordered, resorted or rearranged periodically according to a time-varying criterion rule. In some embodiments, information of the live streaming programs in the candidate set are provided periodically to the user according to results of the reordering process.

Figure 2:
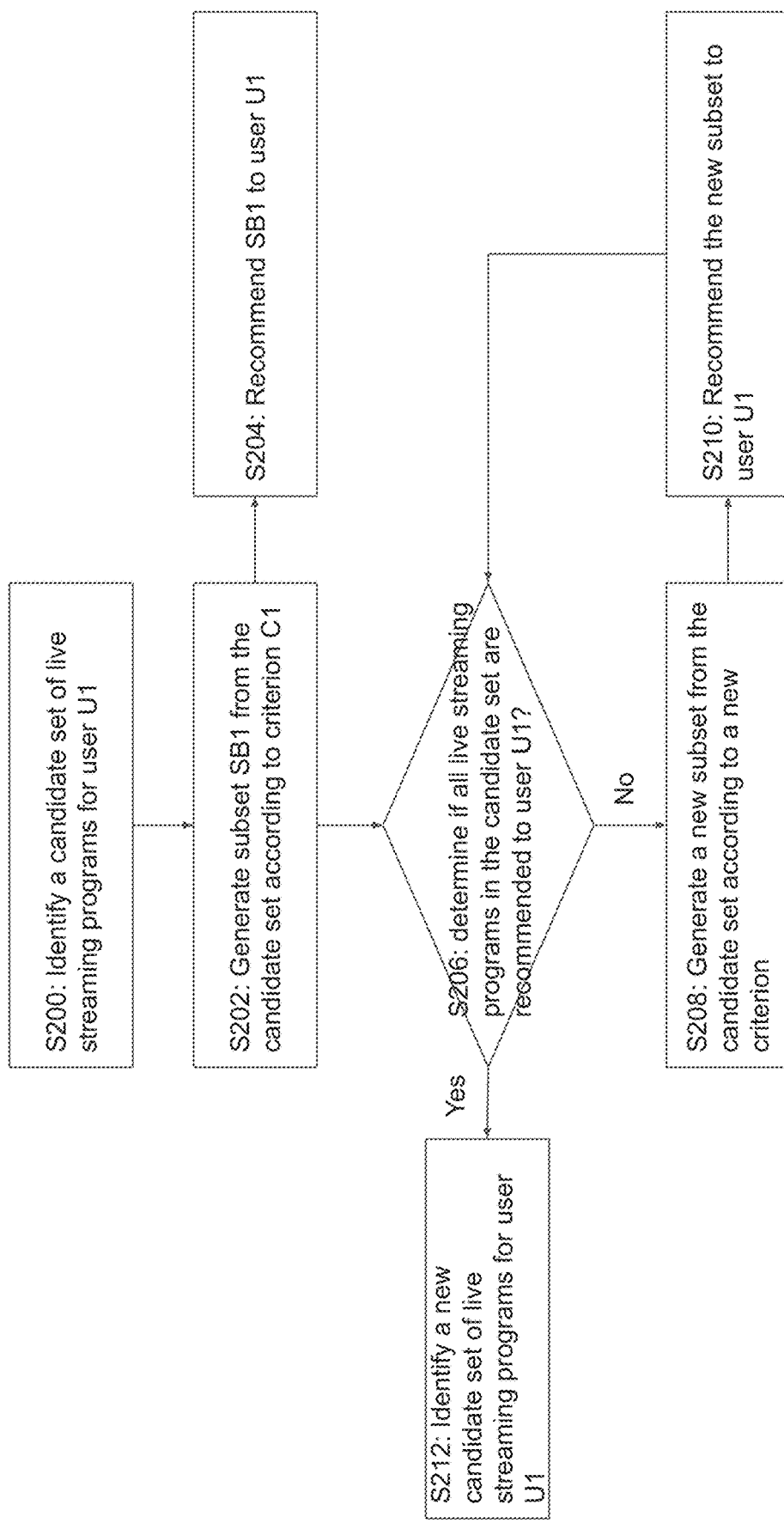
FIG. 2 shows an exemplary flow chart illustrating a method of recommendation in accordance with some embodiments of the present disclosure.

FIG. 2 shows an exemplary flow chart illustrating a method of recommendation in accordance with some embodiments of the present disclosure. FIG. 2 shows how contents are recommended to a user U1 in some embodiments.

Step S200 is similar to step S100 in FIG. 1.
Step S202 is similar to step S102 in FIG. 1.
Step S204 is similar to step S104 in FIG. 1.

In step S206, it is determined that if all live streaming programs in the candidate set are already recommended to user U1? If yes, the flow goes to step S212, otherwise the flow goes to step S208. In some embodiments, it is determined if there is still any live streaming program in the candidate set that has not yet been recommended to user U1 (or, not included in the subset SB1, or, excluded from the subset SB1). If there is a live streaming program in the candidate set that has not yet been recommended to user U1, the flow goes to S208, otherwise the flow goes to step S212. The processes described in step S206 could be performed by the recommending unit in reference to the recommendation table 320, or could be performed by another determining unit in a server of the live streaming system.

In step S208, a new subset of live streaming programs is generated, sorted or determined, from the candidate set of live streaming programs, according to a new criterion. The new criterion is determined such that the new subset includes live streaming programs in the candidate set that have not yet been recommended to user U1. In some embodiments, an AI or machine learning algorithm may be used to determine the new criterion. For example, an AI or machine learning algorithm could be used to analyze those live streaming programs in the candidate set that have not yet been recommended to user U1, to find out one or more tags/attributes shared by one or more of those live streaming programs (or "remaining" live streaming programs), and to include the tags/attributes when determining the new criterion.

In step S210, the new subset of live streaming programs is recommended to user U1, and the flow goes back to S206.

In step S212, wherein all live streaming programs in the candidate set are already recommended to user U1, a new candidate set of live streaming programs for user U1 is to be generated or identified.

Figure 3:
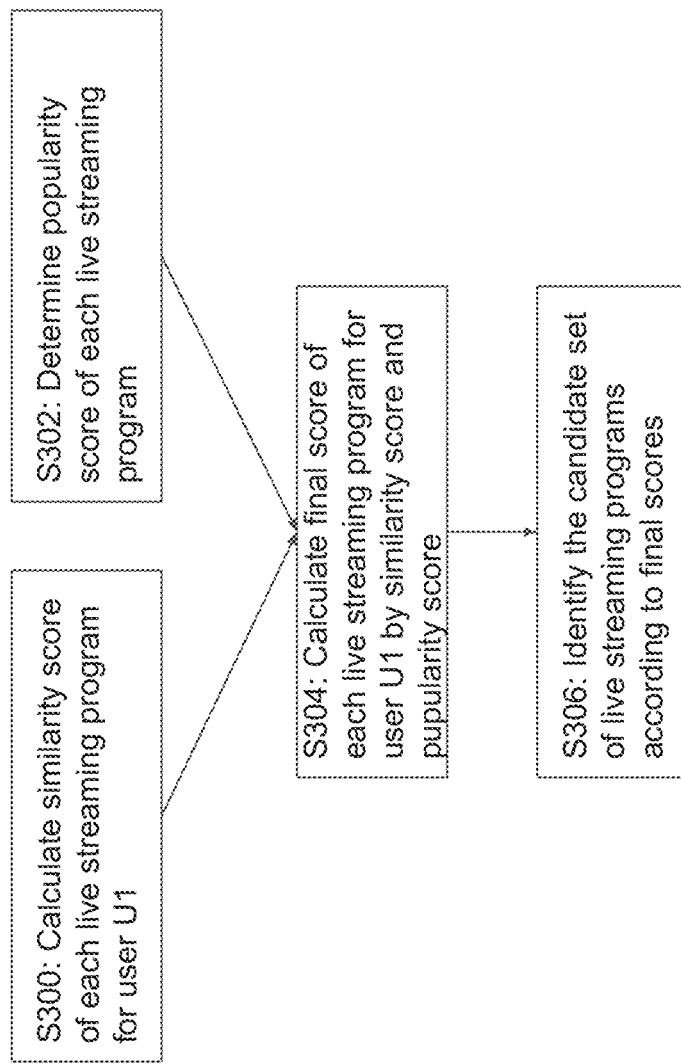
FIG. 3 shows an exemplary flow chart illustrating a method of identifying a candidate set of live streaming programs in accordance with some embodiments of the present disclosure.

FIG. 3 shows an exemplary flow chart illustrating a method of identifying a candidate set of live streaming programs in accordance with some embodiments of the present disclosure. FIG. 3 shows how the candidate set of live streaming programs are generated for user U1 in some embodiments.

In step S300, a similarity score of each available live streaming program is calculated for user U1. The similarity score may be generated according to attributes (or tags) of user U1 and tags of the corresponding live streaming program. For example, a dot product of an attribute vector of user U1 and a tag vector of the live streaming program can be calculated to deliver the similarity score. The similarity score can be used to indicate how likely user U1 will be interested in the corresponding live streaming program. The higher the similarity score is, the more likely user U1 will find the corresponding live streaming program interesting.

Attributes or tags of user U1 can be obtained by input from user U1 and/or behaviors of user U1. Tags of the live streaming program can be generated by an AI or machine learning model stored in the model DB 312. For example, an AI or machine learning model may take the live streaming program as input and deliver the corresponding tags, wherein an object detection method, a motion detection method or a sound detection method may be performed.

In step S302, a popularity score is determined or generated for each available live streaming program. The popularity score could be calculated in various ways. For example, the popularity score may be generated according to a number of comments made by other users in the live streaming program, according to a view duration viewed by other users viewing the live streaming program, according to a user retention rate for the live streaming program, according to a speed of other users or new users joining the live streaming program, or according to an idle time duration made by other users during viewing the live streaming program. In some embodiments, a user retention rate for a live streaming program indicates how many (or a percentage) of users who have seen the live streaming program (or have seen live streaming programs from the same distributor) returns to the live streaming program again.

In some embodiments, the popularity score may be proportional to a number of comments made by other users in the live streaming program, proportional to a view duration viewed by other users viewing the live streaming program, proportional to a user retention rate for the live streaming program, proportional to a speed of other users or new users joining the live streaming program, or inversely proportional to an idle time duration made by other users during viewing the live streaming program.

In some embodiments, the popularity score of a live streaming program is not affected by tags of one user, and simply indicates how popular in general the live streaming program is.

In step S304, a final score of each live streaming program is calculated for user U1. The final score is calculated according to the similarity score of the live streaming program (with respect to user U1) and the popularity score of the live streaming program. For example, a weighted sum of the popularity score and the similarity score may be used to deliver the final score. The weights can be determined according to practical implementation. For example, a higher weight on the similarity score results in recommending a more personalized or customized candidate set of live streaming programs to the user. A higher weight on the popularity score results in recommending contents that are more popular in mainstream to the user.

In step S306, a candidate set of live streaming programs is identified or determined according to the final scores of all available live streaming programs. The process can be performed in various ways. For example, a threshold value for the final score may be set to filter out the candidate set.

In some embodiments, attributes of the user and/or tags of the live streaming program can be determined periodically or in a time-varying manner, which can result in time-varying attributes of the user and/or time-varying tags of the live streaming program. In that case, the candidate set of live streaming programs for the user would be time-varying also, which means live streaming programs in the candidate set of live streaming programs change over time.

In some embodiments, the time-varying attributes of the user are determined based at least on interaction between the user and a live streaming program selected by the user from a subset of live streaming programs. In some embodiments, the time-varying tags of live streaming programs are determined in realtime by use of at least one machine-learning model. In some embodiments, the candidate set of live streaming programs is updated according to the determined time-varying attributes of the user and the determined time-varying tags of live streaming programs.

Processes described in FIG. 3 could be performed by the candidate identifying unit 302, or could be performed by one or more calculating units within a server of the live streaming system.

FIG. 4 shows an exemplary available LS table 316 of available live streaming programs in accordance with some embodiments of the present disclosure.

In the example shown in FIG. 4, there are 100 live streaming programs, labeled as LS1, LS2, LS3, . . . , LS100. For each live streaming program, 3 tags, TG1, TG2 and TG3, are determined to form a streaming tag vector. For each live streaming program, a popularity score is determined. The number of tags, or the dimension of the streaming tag vector, can be chosen according to actual practice. More tags indicates higher granularity in classifying the live streaming programs and may lead to more precise or more customized recommendations.

FIG. 5 shows an exemplary user table 318 of users in accordance with some embodiments of the present disclosure.

In the example shown in FIG. 5, there are 2 users, labeled as U1 and U2. For each user, 3 tags (or attributes), TG1, TG2 and TG3, are determined to form a user tag vector (or a user attribute vector). The number of tags, or the dimension of the user tag vector, can be chosen according to actual practice. More tags indicates higher granularity in classifying the users and may lead to more precise or more customized recommendations. In some embodiments, tags (or attributes) for users and tags for live streaming programs are from the same tag pool, which means the tags used to classify users are the same as the tags used to classify live streaming programs. In that case, the streaming tag vector and the user tag vector have the same dimension or the same amount of elements.

FIG. 6 shows an example of similarity score calculation in accordance with some embodiments of the present disclosure.

As shown in FIG. 6, dot products of the user tag vectors and the streaming tag vectors are calculated to produce similarity scores. For example, the similarity score of the live streaming program LS1 for (or, with respect to) user U1 is a dot product of the streaming tag vector of the live streaming program LS1 ([1, 0, 0]) and the user tag vector of user U1 ([1, 1, 1]), which equals to 1. The similarity score of the live streaming program LS3 for (or, with respect to) user U1 is a dot product of the streaming tag vector of the live streaming program LS3 ([1, 0.5, 1]) and the user tag vector of user U1 ([1, 1, 1]), which equals to 2.5.

FIG. 7 shows an example of final score calculation in accordance with some embodiments of the present disclosure.

As shown in FIG. 7, weighted sums of similarity scores and popularity scores are calculated to produce final scores. In this embodiment, equal weights are set for the similarity score and the popularity score. Therefore, the final score of the live streaming program LS2 for user U1 is 2*1+0.7*1=2.7. The final score of the live streaming program LS3 for user U1 is 2.5*1+0.1*1=2.6. The final scores would be used to determine the candidate set of live streaming programs for a specific user.

As shown in this embodiment, for user U1, even though LS2 has a lower similarity score (less similarity matching) than LS3, by becoming more popular in general (higher popularity score), LS2 has a higher priority to be recommended to user U1 (higher final score).

FIG. 8 shows an exemplary recommendation table 320 for storing the results of generating subsets of live streaming programs in accordance with some embodiments of the present disclosure.

As shown in FIG. 8, the candidate set of live streaming programs for a specific user includes live streaming programs LSS1, LSS2, . . . , LSS10, which could be a result of identification based on final scores of available live streaming programs for the user. In the first 5 mins (for example, first 5 mins of the user staying on a platform for live streaming accessing), criterion C1 is implemented to generate the subset SB1, which includes the live streaming programs LSS1, LSS4 and LSS7. Information about the subset SB1 (or the corresponding live streaming programs) may be provided to the user or the user terminal subsequently. In the next 5 mins, criterion C2 is implemented to generate the subset SB2, which includes the live streaming programs LSS3, LSS6 and LSS8. Information about the subset SB2 (or the corresponding live streaming programs) may be provided to the user or the user terminal subsequently. In the next 5 mins, criterion C3 is implemented to generate the subset SB3, which includes the live streaming programs LSS2, LSS5, LSS9 and LSS10. Information about the subset SB3 (or the corresponding live streaming programs) may be provided to the user or the user terminal subsequently.

In some embodiments, switching between recommendations of different subsets of live streaming programs (or switching between recommendations of different live streaming programs among the same subset of live streaming programs) may happen while the user is at a waiting page or a selection page (such as a home page, a top page, a genre page or a hot page) of a live streaming platform.

In some embodiments, switching between recommendations of different subsets of live streaming programs (or switching between recommendations of different live streaming programs among the same subset of live streaming programs) may happen when the user just leaves a streaming program such as a chat room. For example, the recommended live streaming programs displayed to the user before the user enters or accesses a live streaming program may be different from the recommended live streaming programs displayed to the user after the user leaves or exits the live streaming program. In some embodiments, it is determined or detected whether or not the user has accessed any streaming program, which can be performed, for example, by a detecting unit within a server of the live streaming platform. If it is determined that the user has finished accessing a live streaming program (for example, the user has entered and left the live streaming program), information of a new subset of live streaming programs will be provided to the user. In that case, the user will not see the same recommended contents and may stay longer with the refreshed recommendations.

Figure 12:
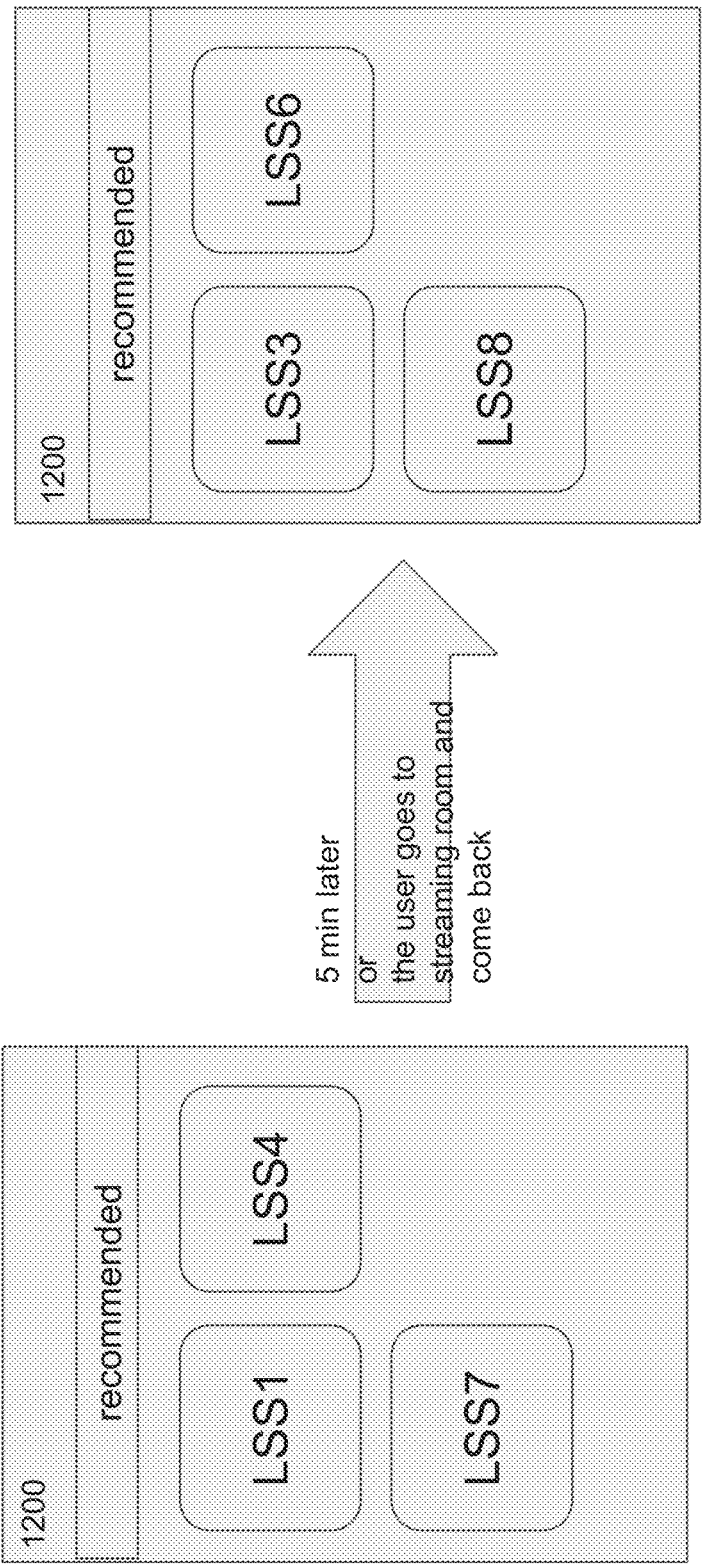
FIG. 12 shows an exemplary page of recommendation in accordance with the embodiment shown in FIG. 8.

FIG. 12 shows an exemplary page of recommendation in accordance with the embodiment shown in FIG. 8. The page 1200 may be a awaiting page, a selection page, a home page, a top page, a genre page or a hot page of a live streaming platform. As shown in FIG. 12, during the first 5 mins, information of live streaming programs LSS1, LSS4 and LSS7 (which belong to the subset SB1) are displayed on the recommended section. 5 mins later, or after the user enters and exits a live streaming program, information of live streaming programs LSS3, LSS6 and LSS8 (which belong to the subset SB2) are displayed on the recommended section.

In some embodiments, subsequent criteria (for generating subsets of live streaming programs) are generated according to adjacent categories of live streaming programs. For example, a user may get recommendations of live streaming programs with categories that are adjacent or similar to his or her past preferred contents, which may be determined based on a likeability factor. For example, a user who has been determined to be interested in watching programs of categories such as "Cooking" and/or "Yoga" may get a recommendation to programs with an adjacent category "Fitness". Adjacent categories may be determined according to historical behaviors of different users or among different users, and may evolve over time. In some embodiments, adjacency may be determined by the level of overlap between the users of one category and the users of the other category. For example, if 80% of the users of the category "Yoga" also are categorized in the category "Fitness", then the category "Yoga" may be determined to be adjacent to the category "Yoga." Based on the overlap level (or overlap degree) between different categories, different adjacency levels may also be defined. In some embodiments, criteria for generating subsets of live streaming programs to be recommended to a user may be determined such that a category with a higher adjacency level has higher priority than another category with a lower adjacency level.

In some embodiments, subsequent criteria (for generating subsets of live streaming programs) are generated according to current trends. For example, current trending or prevailing topics in a particular region may be brushed out based on trends on social media (such as twitter or facebook) first, and live streaming programs having similar topics may have higher priority when being recommended to the user.

In some embodiments, within the candidate set of live streaming programs, live streaming programs provided by relatively new (or low level) streamers have higher priority when being recommended to the user. This will help streamers to get users at the start of the stream such that his motivation to perform is high. Also this may give users good interaction and engagement with the streamer from the start of the streaming program.

In some embodiments, subsequent criteria (for generating subsets of live streaming programs) are generated according to user-user similarity, or similarity between users. The user-user similarity may be calculated based on a likability factor, which may be determined by historical behaviors (such as past preferred contents) of the users and AI or machine learning models may be involved. For example, based on the user-user similarity, the liked content of user A will be recommended to another user B whose similarity with respect to user A is higher than a predetermined value. This may help with discovery of the new content for the users.

In some embodiments, correlations between different rules of identifying the candidate set of live streaming programs (such as different weight allocations for similarity scores and popularity scores) and some target metrics (such as revenue or view durations) are monitored and analyzed to improve or optimize the process of identifying the candidate set of live streaming programs accordingly. AI or machine learning models may be implemented. The precision or efficiency of recommendation can be improved.

In some embodiments, correlations between different criterions of generating subsets of live streaming programs and some target metrics (such as revenue or view durations) are monitored and analyzed to improve or optimize the criterion rule of generating the subsets of live streaming programs accordingly. AI or machine learning models may be implemented. The precision or efficiency of recommendation can be improved.

Figure 11:
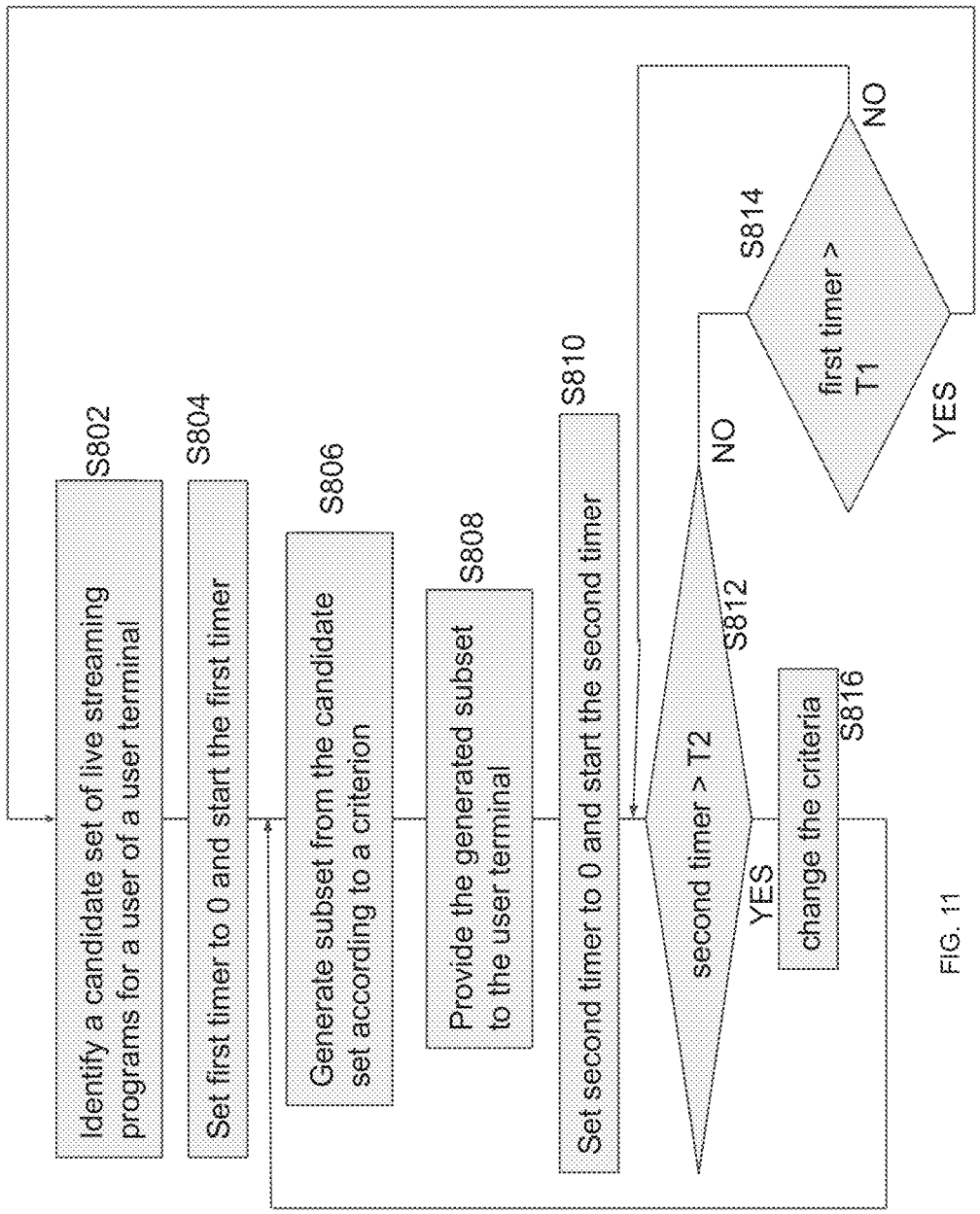
FIG. 11 shows an exemplary flowchart for recommendation process in accordance with some embodiments of the present disclosure.

FIG. 11 shows an exemplary flowchart for recommendation process in accordance with some embodiments of the present disclosure. At step S802, the candidate identifying unit 302 identifies a candidate set of live streaming programs for a user of a user terminal according to the similarity scores. At step S804, the candidate identifying unit 302 (or another timer control unit) sets a first timer to 0 and starts the first timer. At step S806, the subset generating unit 304 generates a subset of live streaming programs from the candidate set according to a criterion stored in the criterion DB 314. At step S808, the recommending unit 306 provides the generated subset to the user terminal via a network. At step S810, the recommending unit 306 (or another timer control unit) sets a second timer to 0 and starts the second timer. At step S812, the recommending unit 306 checks whether the second timer exceeds a predetermined threshold value T2. If not exceeds, at step S814, the candidate identifying unit 302 checks whether the first timer exceeds a predetermined threshold value T1. If exceeds, then the process goes back to step S802 and a new candidate set is identified by the candidate identifying unit 302. If the first timer does not exceed the value T1, then the process goes back to the step S812. If the second timer exceeds the value T2 at the step S812, then the subset generating unit 304 (or another criteria managing unit) changes or updates the criterion by referring to the criterion DB 314. Then the process goes back to step S806, and a new subset of live streaming programs will be generated with an updated criterion.

T1 can be set, for example, to be greater than T2. T1 may be 10 minutes, 5 minutes or any other suitable number. T2 may be 3 minutes, 2 minutes or any other suitable number.

In other embodiments, T1 can be set to be less than T2. In this case, the step S810 may be placed after the step S816. In some embodiments, that can ensure the criterion to be changed or updated before the next round of recommending the generated subset to the user terminal. In some embodiments, that can prevent recommending to the user terminal contents that have already been recommended previously.

In a further embodiment, identification of the candidate may be synchronized with change or update of the criterion. In this case, just one timer may be used.

FIG. 9 shows a schematic configuration of a communication system according to some embodiments of the present disclosure.

The communication system 1 may provide a live streaming service with interaction via a content. Here, the term "content" refers to a digital content that can be played on a computer device. In other words, the communication system 1 enables a user to participate in real-time interaction with other users on-line. The communication system 1 includes a plurality of user terminals 10, a backend server 30, and a streaming server 40. The user terminals 10, the backend server 30 and the streaming server 40 are connected via a network 90, which may be the Internet, for example. The backend server 30 may be a server for synchronizing interaction between the user terminals and/or the streaming server 40. In some embodiments, the backend server 30 may be referred to as the server of an application (APP) provider. The streaming server 40 is a server for handling or providing streaming data or video data. In some embodiments, the backend server 30 and the streaming server 40 may be independent servers. In some embodiments, the backend server 30 and the streaming server 40 may be integrated into one server. In some embodiments, the user terminals 10 are client devices for the live streaming service. In some embodiments, the user terminal 10 may be referred to as viewer, streamer, anchor, podcaster, audience, listener or the like. Each of the user terminal 10, the backend server 30, and the streaming server 40 is an example of an information-processing device. In some embodiments, the streaming may be live streaming or video replay. In some embodiments, the streaming may be audio streaming and/or video streaming. In some embodiments, the streaming may include contents such as online shopping, talk shows, talent shows, entertainment events, sports events, music videos, movies, comedy, concerts or the like.

In some embodiments, the users described in FIG. 1, FIG. 2 or FIG. 3 access the live streaming programs through their respective user terminals.

In some embodiments, the processes described in FIG. 1, FIG. 2, or FIG. 3 are performed by a backend server, a streaming server or a user terminal. For example, a backend server or a streaming server may be configured to perform: the calculation of similarity scores, popularity scores and final scores, the process of identifying a candidate set of live streaming programs, the process of determining criterions for generating subsets of live streaming programs, the process of generating subsets of live streaming programs, the process of providing information of live streaming programs to the user (or the user terminal), the process of determining if all live streaming programs in a candidate set are already recommended to a user.

The present disclosure discloses methods for identifying a candidate set of live streaming programs for a user by similarity scores and popularity scores. Therefore the candidate set of live streaming programs is customized for the user and can be viewed as an interest group of live streaming programs for the user. Live streaming programs in the candidate set can be viewed as being in the user's "interest zone". Performance levels or quality levels of live streaming programs are also considered by incorporating the popularity scores.

The present disclosure discloses methods for recommending different subsets of live streaming programs (which are generated from the candidate set of live streaming programs by different criterions) to the user. Therefore each live streaming program in the user's "interest zone" may have an equal chance of being recommended to the user (or an equal visibility). Some contents may not be popular in general but may have high attractiveness for a specific user. The chance of keeping the user more dedicated on the platform can be increased.

The present disclosure discloses methods for recommending different live streaming programs in the candidate set to the user in an automatic manner. Therefore the user does not feel bored while staying at a selection page or after accessing a live streaming program, which can keep the user longer on the platform.

The processing and procedures described in the present disclosure may be realized by software, hardware, or any combination of these in addition to what was explicitly described. For example, the processing and procedures described in the specification may be realized by implementing a logic corresponding to the processing and procedures in a medium such as an integrated circuit, a volatile memory, a non-volatile memory, a tangible non-transitory computer-readable medium and a magnetic disk. Further, the processing and procedures described in the specification can be implemented as a computer program corresponding to the processing and procedures, and can be executed by various kinds of computers.

Furthermore, the system or method described in the above embodiments may be integrated into programs stored in a computer-readable tangible non-transitory medium such as a solid state memory device, an optical disk storage device, or a magnetic disk storage device. Alternatively, the programs may be downloaded from a server via the Internet and be executed by processors.

Although technical content and features of the present disclosure are described above, a person having common knowledge in the technical field of the present disclosure may still make many variations and modifications without disobeying the teaching and disclosure of the present disclosure. Therefore, the scope of the present disclosure is not limited to the embodiments that are already disclosed, but includes another variation and modification that do not disobey the present disclosure, and is the scope covered by the patent application scope.

DESCRIPTION OF REFERENCE NUMERALS

1 Communication system
10 User terminal

30 Backend server
40 Streaming server
90 Network
S100, S102, S104, S106, S108 Step
S200, S202, S204, S206, S208, S210, S212 Step
S300, S302, S304, S306 Step
TG1, TG2, TG3 Tag
LS Live streaming program
LSS Live streaming program
U1, U2 User
300 server
302 Candidate identifying unit
304 Subset generating unit
306 Recommending unit
308 Attribute determining unit
310 Tag determining unit
312 Model DB
314 Criterion DB
316 Available LS table
318 User table
320 Recommendation table
S800, S802, S804, S806, S808, S810, S812, S814, S816 Step
1200 page

What is claimed is:

1. A method for providing information of live streaming programs to a user, comprising:
identifying a set of live streaming programs according to an attribute of the user and a tag of each live streaming program in the set of live streaming programs;
generating a first subset of live streaming programs from the set of live streaming programs according to a first criterion;
providing information of the first subset of live streaming programs to the user,
wherein all live streaming programs in the first subset generated according to the first criterion are being distributed concurrently in a live manner at a timing of the providing the information of the first subset of live streaming programs to the user, and
wherein the all live streaming programs in the first subset overlap in time at the timing of the providing the information of the first subset of live streaming programs to the user;
generating a second subset of live streaming programs from the set of live streaming programs according to a second criterion, wherein the first criterion is different from the second criterion; and
providing information of the second subset of live streaming programs to the user after providing the information of the first subset of live streaming programs to the user,
wherein all live streaming programs in the second subset generated according to the second criterion are being distributed concurrently in a live manner at a timing of the providing the information of the second subset of live streaming programs to the user, and
wherein the all live streaming programs in the second subset overlap in time at the timing of the providing the information of the second subset of live streaming programs to the user.

2. The method according to claim 1, further comprising:
periodically providing to the user information of a new subset of live streaming programs, generated from the set of live streaming programs by a new criterion, in an automatic manner without any input from the user indicating a request for a new subset of live streaming programs.

3. The method according to claim 1, wherein the first criterion and the second criterion are determined such that there is no overlap between the first subset of live streaming programs and the second subset of live streaming programs.

4. The method according to claim 1, wherein the set of live streaming programs is identified according to time-varying attributes of the user and time-varying tags of each live streaming program in the set of live streaming programs, and live streaming programs in the set of live streaming programs change over time.

5. The method according to claim 4, further comprising:
determining the time-varying attributes of the user based at least on interaction between the user and a live streaming program selected by the user from the first subset of live streaming programs;
determining the time-varying tags of each live streaming program in realtime by use of at least one machine-learning model; and
updating the set of live streaming programs according to the determined time-varying attributes of the user and the determined time-varying tags of each live streaming program.

6. The method according to claim 1, wherein identifying the set of live streaming programs comprises calculating a dot product of an attribute vector of the user and a tag vector of each live streaming program in the set of live streaming programs.

7. The method according to claim 6, wherein identifying the set of live streaming programs further comprises:
generating a popularity score for a live streaming program in the set of live streaming programs according to a number of comments made by another user in the live streaming program, according to a view duration viewed by another user viewing the live streaming program, according to a user retention rate for the live streaming program, according to a speed of new users joining the live streaming program, and/or according to an idle time duration made by another user during viewing the live streaming program; and
calculating a weighted sum of the popularity score and the dot product,
wherein the popularity score is proportional to the number of comments made by another user in the live streaming program, is proportional to the view duration viewed by another user viewing the live streaming program, is proportional to the user retention rate for the live streaming program, is proportional to the speed of new users joining the live streaming program, or is inversely proportional to the idle time duration made by another user during viewing the live streaming program.

8. The method according to claim 1, further comprising:
determining a live streaming program in the set of live streaming programs not to be included in the first subset of live streaming programs; and
determining the second criterion according to an attribute of the live streaming program such that the live streaming program is included in the second subset of live streaming programs.

9. The method according to claim 1, further comprising:
determining the user to have finished accessing a live streaming program, wherein the information of the second subset of live streaming programs is provided to the user after determining the user to have finished accessing the live streaming program.

10. A method for providing information of live streaming programs to a user, comprising:
   identifying a set of live streaming programs according to attributes of the user and tags of each live streaming program in the set of live streaming programs;
   periodically reordering live streaming programs in the set of live streaming programs according to a time-varying criterion rule; and
generating a first subset of live streaming programs from the set of live streaming programs according to a first criterion;
   periodically providing information of the first subset of the live streaming programs in the set of live streaming programs to the user according to results of the reordering;
   wherein all live streaming programs in the first subset of live streaming programs generated according to the first criterion are being distributed concurrently in a live manner at a timing of the providing the information of the live streaming programs in the first subset of live streaming programs to the user, and
   wherein the all live streaming programs in the first subset of live streaming programs overlap in time at the timing of the providing the information of the live streaming programs in the first subset of live streaming programs to the user;
   generating a second subset of live streaming programs from the set of live streaming programs according to a second criterion, wherein the first criterion is different from the second criterion; and
   periodically providing information of the second subset of live streaming programs to the user according to results of the reordering after periodically providing the information of the first subset of live streaming programs to the user,
   wherein all live streaming programs in the second subset generated according to the second criterion are being distributed concurrently in a live manner at a timing of the providing the information of the second subset of live streaming programs to the user, and
   wherein the all live streaming programs in the second subset overlap in time at the timing of the providing the information of the live streaming programs in the second subset of live streaming programs to the user.

11. A system for providing information of live streaming programs to a user, comprising one or a plurality of processors, wherein the one or plurality of processors execute a machine-readable instruction to perform:
   identifying a set of live streaming programs according to an attribute of the user and a tag of each live streaming program in the set of live streaming programs;
   generating a first subset of live streaming programs from the set of live streaming programs according to a first criterion; and
   providing information of the first subset of live streaming programs to the user when,
   wherein all live streaming programs in the first subset generated according to the first criterion are being distributed concurrently in a live manner at a timing of the providing the information of the first subset of live streaming programs to the user, and
   wherein the all live streaming programs in the first subset overlap in time at the timing of the providing the information of the first subset of live streaming programs to the user;
   generating a second subset of live streaming programs from the set of live streaming programs according to a second criterion, wherein the first criterion is different from the second criterion; and
   providing information of the second subset of live streaming programs to the user after providing the information of the first subset of live streaming programs to the user,
   wherein all live streaming programs in the second subset generated according to the second criterion are being distributed concurrently in a live manner at a timing of the providing the information of the second subset of live streaming programs to the user, and
   wherein the all live streaming programs in the second subset overlap in time at the timing of the providing the information of the second subset of live streaming programs to the user.

\* \* \* \* \*